United States Patent
Xu et al.

(10) Patent No.: US 11,760,843 B2
(45) Date of Patent: Sep. 19, 2023

(54) NANOMATERIAL OF POLYGLYCEROL GRAFTED CELLULOSE NANOCRYSTAL DENDRIMER AND PREPARATION METHOD THEREOF

(71) Applicant: JIANGNAN UNIVERSITY, Wuxi (CN)

(72) Inventors: Shuqin Xu, Wuxi (CN); Jinghua Chen, Wuxi (CN); Baoliang Mao, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 0 days.

(21) Appl. No.: 18/125,690

(22) Filed: Mar. 23, 2023

(65) Prior Publication Data
US 2023/0227615 A1    Jul. 20, 2023

Related U.S. Application Data

(63) Continuation of application No. PCT/CN2021/143797, filed on Dec. 31, 2021.

(30) Foreign Application Priority Data

Jan. 6, 2021 (CN) .......................... 202110013564.9

(51) Int. Cl.
*C08B 1/06* (2006.01)
*C08G 83/00* (2006.01)

(52) U.S. Cl.
CPC .............. *C08G 83/003* (2013.01); *C08B 1/06* (2013.01)

(58) Field of Classification Search
None
See application file for complete search history.

(56) References Cited

U.S. PATENT DOCUMENTS

2016/0208087 A1* 7/2016 Virtanen ................ D21H 11/20
2017/0027168 A1* 2/2017 Heath ..................... A61P 17/00
2019/0127625 A1* 5/2019 Wu ........................ C09K 8/206

FOREIGN PATENT DOCUMENTS

CA    3005140 A1    5/2017
CN    105601878 A    5/2016
(Continued)

OTHER PUBLICATIONS

Google scholar search (cellulose nanocrystals and Tempo and glycidal (Year: 2023).*

*Primary Examiner* — Peter A Salamon
(74) *Attorney, Agent, or Firm* — SZDC LAW P.C.

(57) ABSTRACT

The invention provides a nanomaterial of polyglycerol grafted cellulose nanocrystal dendrimer and a preparation method thereof. In the present invention, the cotton linter pulp is pulverized into flocculent fibers, fed to sulfuric acid, and reacted. After centrifugation, dialysis and ultrasonic cell disruption, cellulose nanocrystals are obtained. Carboxylated cellulose nanocrystals are further obtained after oxidation with TEMPO, dialysis, and freeze-drying. The carboxylated nanocrystals are further added to DMF, and under a nitrogen atmosphere, glycidol is grafted to the hydroxyl groups on the surface by heating with stirring. After the reaction is completed, the product is centrifuged, dried under vacuum, dialyzed, and freeze dried to obtain a nanomaterial of primary polyglycerol grafted cellulose nanocrystals. Dendrimers with different particle size ranges can be prepared by controlling the number of reactions, which contain a large number of hydroxyl groups on the surface, and are amenable to various modifications.

10 Claims, 2 Drawing Sheets

(56) References Cited

FOREIGN PATENT DOCUMENTS

| CN | 108409997 | A | | 8/2018 | | |
|----|-----------|---|---|--------|---|---|
| CN | 110387028 | A | * | 10/2019 | ............. | C08B 15/04 |
| CN | 110387028 | A | | 10/2019 | | |
| CN | 112778532 | A | | 5/2021 | | |

* cited by examiner

NANOMATERIAL OF POLYGLYCEROL GRAFTED CELLULOSE NANOCRYSTAL DENDRIMER AND PREPARATION METHOD THEREOF

This application is a Continuation Application of PCT/CN2021/143797, filed on Dec. 31, 2021, which claims priority to Chinese Patent Application No. 202110013564.9, filed on Jan. 6, 2021, which is incorporated by reference for all purposes as if fully set forth herein.

FIELD OF THE INVENTION

The present invention relates to the technical field of dendrimer nano-materials, and more particularly to a nanomaterial of polyglycerol grafted cellulose nanocrystal dendrimer and a preparation method thereof.

DESCRIPTION OF THE RELATED ART

Dendrimers are a new class of nano-scale monodisperse polymers. The highly branched structure and unique monodispersity impart them special properties and functions. For example, the molecules have delicate shapes, extensive internal pores, and a large number of active groups on the outside. In recent years, dendrimers find increasingly wide use in catalysts, metal nanomaterials, composite nanomaterials, membrane materials, surfactants, medicines and other fields. The study of dendrimers has attracted more and more attention from scientists in China and other countries.

The study of dendrimers involves inorganic chemistry, organic chemistry, polymer chemistry, life sciences and coordination chemistry. As for the synthesis methods of dendrimers, how to conveniently, quickly, and accurately synthesize a dendrimer with a designed structure is one of the hotspots in current dendrimer research. The synthesis methods of dendrimers are different from that for ordinary linear polymers. The commonly used methods generally include the divergent synthesis, convergent synthesis, and divergent-convergent synthesis. However, in the preparation of dendrimer nanomaterials in the prior art, problems occur, such as more steps, long period, poor biocompatibility, and difficulty in application in the field of biomaterials. Moreover, the particle size of the dendrimer nanomaterial is difficult to control.

The present invention provides a nanomaterial of hyperbranched polyglycerol grafted cellulose nanocrystal dendrimer and a preparation method thereof. The dendrimer nanomaterial is synthesized with biocompatible cellulose nanocrystal and glycidol. The synthesis method is convenient and quick, and a large number of hydroxyl groups are present on the surface of the material. After modification, it can be used to prepare micelles, nanoparticles, microspheres and other biocomposite materials. By repeating the steps, dendrimer nanomaterials with various particle sizes can be obtained.

SUMMARY OF THE INVENTION

To solve the problems of more steps, long period, poor biocompatibility, and difficulty in application in the field of biomaterials in the preparation of dendrimer nanomaterials in the prior art, the present invention provides a nanomaterial of hyperbranched polyglycerol grafted cellulose nanocrystal dendrimer and a preparation method thereof. The dendrimer nanomaterial is synthesized with biocompatible cellulose nanocrystal and glycidol. The synthesis method is convenient and quick, and a large number of hydroxyl groups are present on the surface of the material. After modification, it can be used to prepare micelles, nanoparticles, microspheres and other biocomposite materials. To solve the problem that the particle size of dendrimer nanomaterials is difficult to control in the prior art, the present invention provides a nanomaterial of hyperbranched polyglycerol grafted cellulose nanocrystal dendrimer and a preparation method thereof. By repeating the steps, dendrimer nanomaterials with various particle sizes can be obtained.

A method for preparing a nanomaterial of polyglycerol grafted cellulose nanocrystal dendrimer is provided, which uses a cotton linter pulp as a raw material.

The method includes specifically the following steps:
(1) pulverizing cotton linter pulp into flocculent fibers, feeding to sulfuric acid, reacting, centrifuging, dialyzing, and performing ultrasonication to obtain cellulose nanocrystals;
(2) dissolving the cellulose nanocrystals into water to obtain a cellulose nanocrystal solution, oxidizing the solution with TEMPO, then dialyzing, and freeze drying to obtain carboxylated cellulose nanocrystals;
(3) adding the carboxylated cellulose nanocrystals into an organic solvent, adding glycidol dropwise with stirring and heating under a nitrogen atmosphere to graft glycidol to the hydroxyl groups on the surface of the carboxylated cellulose nanocrystal, centrifuging after reaction, drying under vacuum, dialyzing, and freeze drying to obtain the nanomaterial of polyglycerol grafted cellulose nanocrystal dendrimer.

Preferably, the method further includes: replacing the carboxylated cellulose nanocrystals in Step (3) by the nanomaterial of polyglycerol grafted cellulose nanocrystal dendrimer obtained in Step (3), and repeating Step (3), to further obtain the nanomaterial of polyglycerol grafted cellulose nanocrystal dendrimer with various particle sizes.

Preferably, in Step (1), the concentration of sulfuric acid is 25-70%, the reaction temperature is 29-70° C., and the reaction time is 3-12 h, preferably 6-12 h.

In the ultrasonic disruption, the power of ultrasonication is 30-50%, and the disruption time is 4-35 min, preferably 8-15 min. The supernatant is collected by centrifugation at 7000-13000 rpm/min, to obtain the cellulose nanocrystals.

Preferably, the concentration of the cellulose nanocrystal dissolved in water in Step (2) is 1-20 mg/ml.

Preferably, the oxidization with TEMPO includes specifically mixing the cellulose nanocrystal solution uniformly with tetramethyl piperidine N-oxide and sodium bromide, adding sodium hypochlorite, and reacting for 3-24 h at pH 9.8-11.2 and 25-45° C.

Preferably, the oxidation rate of the carboxylated cellulose nanocrystal in Step (2) is 5-20%.

Preferably, in Step (3), the concentration of glycidol is 10-30%, and the weight ratio of the carboxylated cellulose nanocrystals to glycidol is 1:5-1:15.

Preferably, in Step (3), the stirring time is 30-90 min, the speed is 300-800 rpm/min, and the temperature is 80-120° C.

Preferably, in Step (3), glycidol is added stepwise at a rate of 10-150 μl/min for 4-24 h.

Preferably, in Step (3), the centrifugation is performed at a rotation speed of 6000-10000 rpm/min for 8-15 min.

Preferably, in Step (3), the particle size of the nanomaterial of polyglycerol grafted cellulose nanocrystal dendrimer is in the range of 300-1000 nm.

A second object of the present invention is to provide a nanomaterial of polyglycerol grafted cellulose nanocrystal dendrimer prepared by the method.

The present invention has the following beneficial effects.

Compared with the prior art, the dendrimer nanomaterial is synthesized with biocompatible cellulose nanocrystals and glycidol by the preparation method of the present invention. The synthesis method is convenient and quick, and a large number of hydroxyl groups are present on the surface of the material. After modification, it can be used to prepare micelles, nanoparticles, microspheres and other biocomposite materials. By repeating the steps, dendrimer nanomaterials with various particle sizes can be obtained.

The above description is only a summary of the technical solutions of the present invention. To make the technical means of the present invention clearer and implementable in accordance with the disclosure of the specification, the preferred embodiments of the present invention will be described in detail with reference to the accompanying drawings.

DETAILED DESCRIPTION OF THE PREFERRED EMBODIMENTS

Hereinafter, the present invention is further described with reference to specific embodiments and accompanying drawings. However, the present invention is not limited thereto. Non-essential modifications and adjustments made by those of skill in the art based on the above disclosure also fall within the protection scope of the present invention.

Example 1

(1) Preparation of Cellulose Nanocrystals

The cotton linter pulp was pulverized into flocculent fibers by mechanical crushing. 15 g of the flocculent fibers was added to 200 ml of 30% sulfuric acid, and reacted in a water bath at 60° C. for 6 h. The reaction was quenched by dilution with water. The reaction solution was centrifuged at 8000 rpm/min for 10 min (3×), and the precipitate was discarded. The supernatant was adjusted to a neutral pH with sodium hydroxide, and dialyzed against pure water for three days, during which the pure water was refreshed periodically. The obtained solution was ultrasonically disrupted at a power of 40% for 10 min. Then the solution was centrifuged at 10000 rpm/min for 15 min, and the supernatant was collected to obtain rod-shaped cellulose nanocrystals with a uniform particle size of 200-300 nm.

(2) Preparation of carboxylated cellulose nanocrystals 100 ml of 1% cellulose nanocrystals was uniformly mixed with 140 mg of TEMPO and 360 mg of NaBr, and then 18 ml of NaClO was added, adjusted to pH 10.5, and reacted for 4 h at 37° C., during which the pH was maintained at 10.5. The reaction was quenched by adjusting to a neutral pH, the resulting solution was dialyzed against pure water for 2 days, and freeze dried to obtain carboxylated cellulose nanocrystals.

(3) Hyperbranched Polyglycerol Grafted Cellulose Nanocrystals 300 mg of the carboxylated nanocrystals was added to 9 ml of DMF, and stirred for 30 min at 500 rpm/min under a nitrogen atmosphere. With stirring, 12.5 ml of 20% glycidol was gradually added dropwise at 100° C. over 12 h at a rate of 17 µl/min, to gradually graft glycidol onto the hydroxyl groups on the surface. After reaction for 12 h, the reaction solution was centrifuged at 8000 rpm/min for 10 min, and then washed with 10 ml of DMF (3×), and dried under vacuum. After washing with water, the solution was centrifuged to obtain a precipitate. The precipitate was reconstituted, dialyzed for one day, and freeze dried to obtain a dry product of the nanomaterial of primary polyglycerol grafted cellulose nanocrystal.

Figure 1:
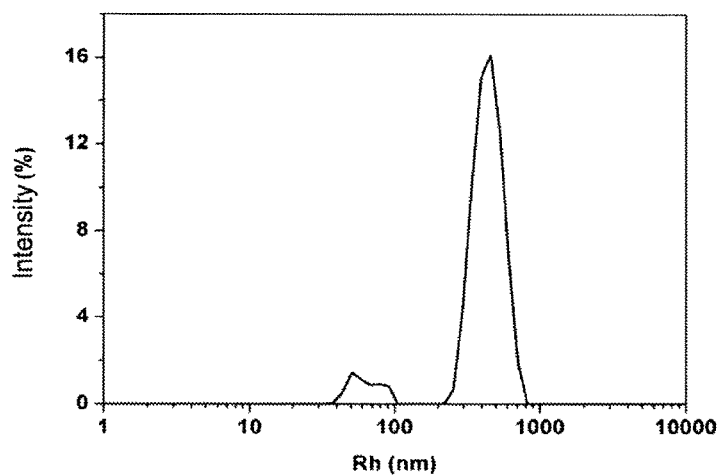
FIG. 1 shows the particle size distribution, measured by DLS, of the hyperbranched polyglycerol grafted cellulose nanocrystal dendrimer in Example 1.
Figure 2:
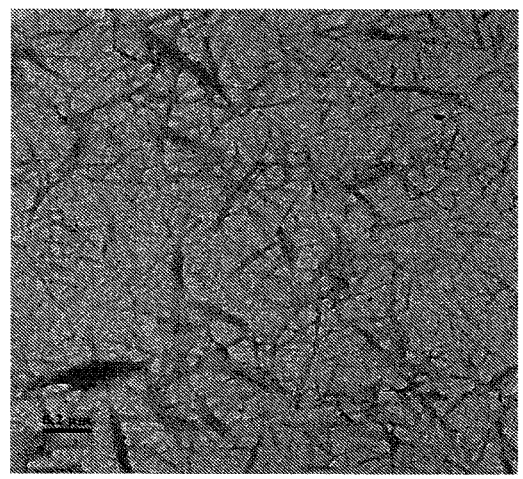
FIG. 2 is a transmission electron microscopy (TEM) image of the hyperbranched polyglycerol grafted cellulose nanocrystal dendrimer.

FIG. 1 shows the particle size distribution, measured by DLS, of the hyperbranched polyglycerol grafted cellulose nanocrystal dendrimer, which is mainly a single symmetric peak, indicating a uniform size, and an Rh of about 420 nm. FIG. 2 shows a transmission electron microscopy (TEM) image of the hyperbranched polyglycerol grafted cellulose nanocrystal dendrimer. The size is about 400 nm, which is consistent with the result of DLS.

Example 2

(1) Preparation of Cellulose Nanocrystals

The cotton linter pulp was pulverized into flocculent fibers by mechanical crushing. 15 g of the flocculent fibers was added to 200 ml of 30% sulfuric acid, and reacted in a water bath at 60° C. for 6 h. The reaction was quenched by dilution with water. The reaction solution was centrifuged at 8000 rpm/min for 10 min (3×), and the precipitate was discarded. The supernatant was adjusted to a neutral pH with sodium hydroxide, and dialyzed against pure water for three days, during which the pure water was refreshed periodically. The obtained solution was ultrasonically disrupted at a power of 40% for 10 min. Then the solution was centrifuged at 10000 rpm/min for 15 min, and the supernatant was collected to obtain rod-shaped cellulose nanocrystals with a uniform particle size of 200-300 nm.

(2) Preparation of carboxylated cellulose nanocrystals 100 ml of 1% cellulose nanocrystals was uniformly mixed with 140 mg of TEMPO and 360 mg of NaBr, and then 18 ml of NaClO was added, adjusted to pH 10.5, and reacted for 4 h at 37° C., during which the pH was maintained at 10.5. The reaction was quenched by adjusting to a neutral pH, the resulting solution was dialyzed against pure water for 2 days, and freeze dried to obtain carboxylated cellulose nanocrystals.

(3) Hyperbranched Polyglycerol Grafted Cellulose Nanocrystals 300 mg of the carboxylated nanocrystals was added to 9 ml of DMF, and under a nitrogen atmosphere, 12.5 ml of 20% glycidol was gradually added dropwise at 100° C. over 12 h at a rate of 17 µl/min, to gradually graft glycidol onto the hydroxyl groups on the surface. After reaction for 12 h, the reaction solution was centrifuged at 8000 rpm/min for 10 min, and then washed with 10 ml of DMF (3×), and dried under vacuum. After washing with water, the solution was centrifuged to obtain a precipitate. The precipitate was reconstituted, dialyzed for one day, and freeze dried to obtain a dry product of the nanomaterial of primary polyglycerol grafted cellulose nanocrystals.

Figure 3:
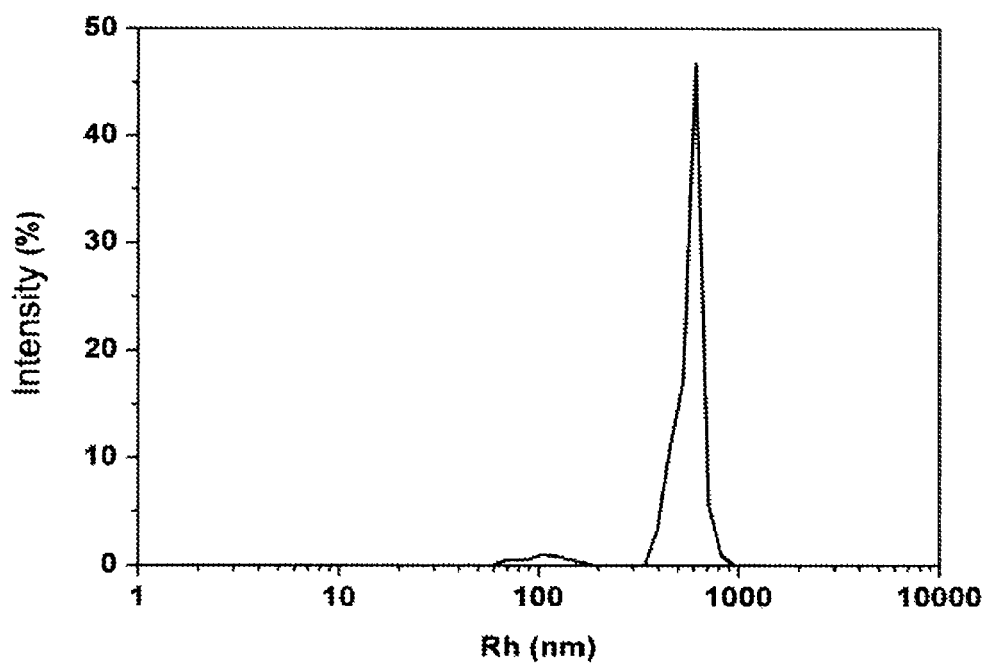
FIG. 3 shows the particle size distribution, measured by DLS, of the hyperbranched polyglycerol grafted cellulose nanocrystal dendrimer in Example 2.

300 mg of the primary hyperbranched polyglycerol grafted cellulose nanocrystals (with a particle size of about 400 nm) was added to 9 ml of DMF, and stirred for 30 min at 500 rpm/min under a nitrogen atmosphere. With stirring, 12.5 ml of 20% glycidol was gradually added dropwise at 100° C. to gradually graft glycidol onto the hydroxyl groups on the surface. After reaction for 12 h, the reaction solution was centrifuged at 8000 rpm/min for 10 min, and then washed with 10 ml of DMF (3×), and dried under vacuum. After washing with water, the solution was centrifuged to obtain a precipitate. The precipitate was reconstituted, dialyzed for one day, and freeze dried to obtain a dry product of the nanomaterial of secondary polyglycerol grafted cellulose nanocrystasl. FIG. 3 shows the particle size distribution, measured by DLS, of the hyperbranched polyglycerol grafted cellulose nanocrystal dendrimer, which is mainly a single symmetric peak, indicating a uniform size, and an Rh of about 600 nm.

While preferred embodiments of the present invention have been described above, the present invention is not limited thereto. It should be noted that several modifications and variations can be made by those of ordinary skill in the art, without departing from the technical principles of the present invention, which are also contemplated in the protection scope of the present invention.

What is claimed is:

1. A method for preparing a nanomaterial of polyglycerol grafted cellulose nanocrystal dendrimer, using a cotton linter pulp as a raw material,
the method comprising steps of:
   (1) pulverizing cotton linter pulp into flocculent fibers, feeding to sulfuric acid, reacting, centrifuging, dialyzing, and performing ultrasonication to obtain cellulose nanocrystals;
   (2) dissolving the cellulose nanocrystals into water to obtain a cellulose nanocrystal solution, oxidizing the solution with TEMPO, then dialyzing, and freeze drying to obtain carboxylated cellulose nanocrystals;
   (3) adding the carboxylated cellulose nanocrystals into an organic solvent, adding glycidol dropwise with stirring and heating under a nitrogen atmosphere to graft glycidol to hydroxyl groups on the surface of the carboxylated cellulose nanocrystals, centrifuging after reaction, drying under vacuum, dialyzing, and freeze drying to obtain the nanomaterial of polyglycerol grafted cellulose nanocrystal dendrimer.

2. The method according to claim 1, further comprising: replacing the carboxylated cellulose nanocrystals in Step (3) by the nanomaterial of polyglycerol grafted cellulose nanocrystal dendrimer obtained in Step (3), and repeating Step (3), to further obtain the nanomaterial of polyglycerol grafted cellulose nanocrystal dendrimer with various particle sizes.

3. The method according to claim 1, wherein in Step (2), the oxidization with TEMPO comprises mixing the cellulose nanocrystal solution uniformly with tetramethyl piperidine N-oxide and sodium bromide, adding sodium hypochlorite, and reacting for 3-24 h at pH 9.8-11.2 and 25-45° C., wherein the concentration of the cellulose nanocrystal solution is 1-20 mg/ml.

4. The method according to claim 1, wherein the oxidation rate of the carboxylated cellulose nanocrystals in Step (2) is 5-20%.

5. The method according to claim 1, wherein in Step (1), the concentration of sulfuric acid is 25-70%, the reaction temperature is 29-70° C., the reaction time is 3-12 h, the power of ultrasonication is 30-50%, the time of ultrasonication is 4-35 min, and the supernatant is collected by centrifugation at 7000-13000 rpm/min, to obtain the cellulose nanocrystals.

6. The method according to claim 1, wherein in Step (3), the concentration of glycidol is 10-30%, and the weight ratio of the carboxylated cellulose nanocrystals to glycidol is 1.5-1.15.

7. The method according to claim 1, wherein in Step (3), the stirring time is 30-90 min, the speed is 300-800 rpm/min, and the temperature is 80-120° C.

8. The method according to claim 1, wherein in Step (3), glycidol is added stepwise at a rate of 10-150 μl/min for 4-24 h.

9. The method according to claim 2, wherein in Step (3), the particle size of the nanomaterial of polyglycerol grafted cellulose nanocrystal dendrimer is in the range of 300-1000 nm.

10. A nanomaterial of polyglycerol grafted cellulose nanocrystal dendrimer prepared by the method according to claim 1.

* * * * *